UNITED STATES PATENT OFFICE.

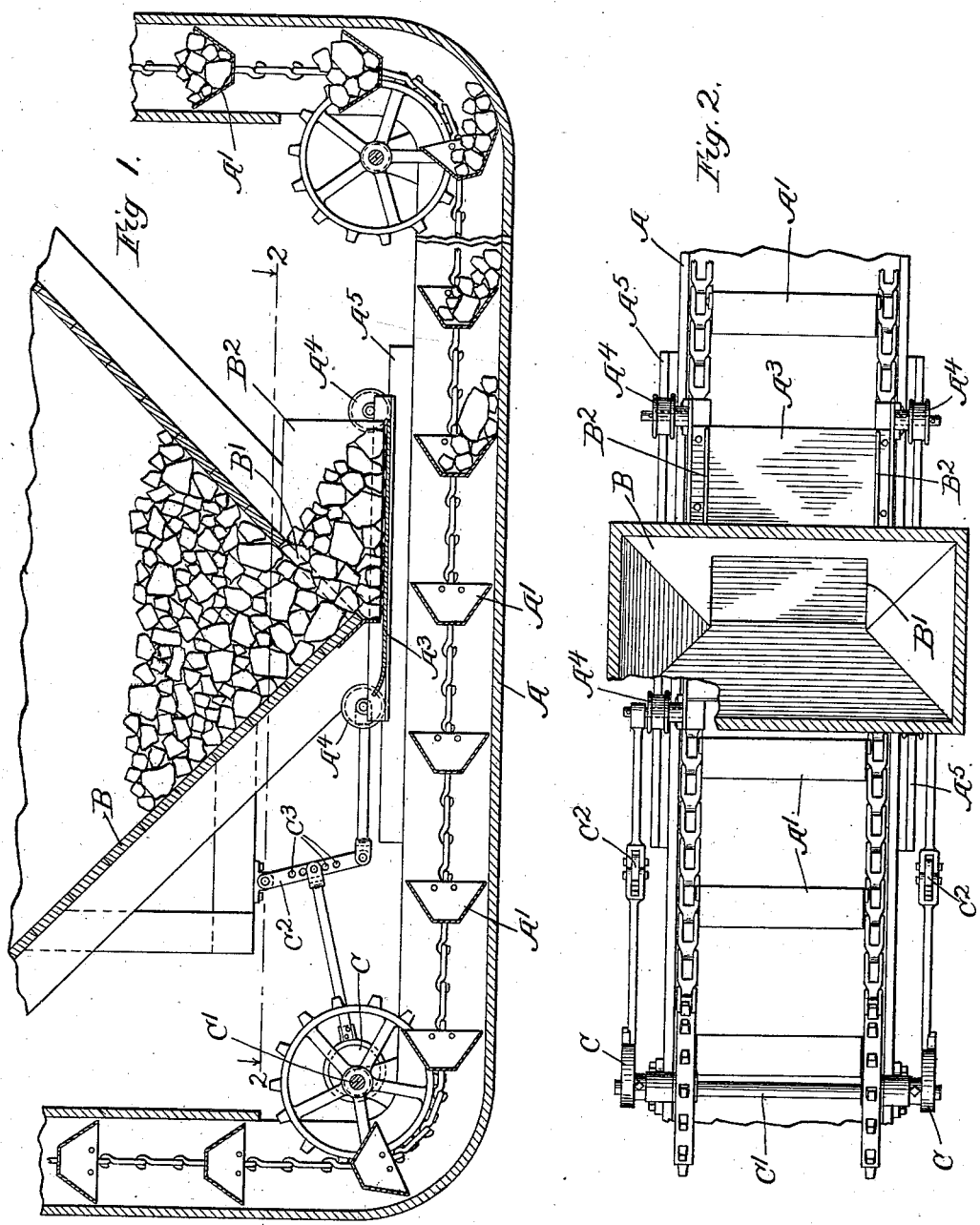

AXEL G. JOHNSON, OF CHICAGO, ILLINOIS, ASSIGNOR TO THE LINK BELT MACHINERY COMPANY, OF SAME PLACE.

FEEDING DEVICE FOR CONVEYERS, &c.

SPECIFICATION forming part of Letters Patent No. 671,825, dated April 9, 1901.

Application filed October 2, 1899. Serial No. 732,304. (No model.)

*To all whom it may concern:*

Be it known that I, AXEL G. JOHNSON, a citizen of the United States, residing at Chicago, in the county of Cook and State of Illinois, have invented a certain new and useful Improvement in Feeding Devices for Conveyers, &c., of which the following is a specification.

My invention relates to feeding devices for conveyers, &c., and has for its object to provide a new and improved feeding device of this description.

My invention is illustrated in the accompanying drawings, wherein—

Figure 1 is a view in part section, showing a construction embodying my invention. Fig. 2 is a plan view of the same.

Like letters refer to like parts throughout both figures.

I have shown my invention in connection with a conveyer adapted to move in a horizontal plane during a part of its travel and then to change to a vertical plane, the material being fed to the conveyer during the horizontal movement. In such a construction the material must be fed in a regular, even, and uniform manner, so as to distribute it among the proper receptacles.

In the drawings I have illustrated my invention in a somewhat diagrammatic manner and have not attempted to set forth in detail the various constructions that may be used.

Referring now to Fig. 1, I have shown a conveyer A, consisting of a series of buckets A', suitably connected together and passing in a horizontal direction beneath a receptacle or hopper B, in which the material to be fed is received, as shown. This conveyer is confined within a suitable trough or the like, preferably open at the top, the material being fed to the conveyer from the hopper B. A movable part $A^3$, operated by some suitable mechanism, is interposed between the conveyer and the discharge-opening B' of the hopper B, so as to receive the material from the hopper after it has passed through said opening. As shown in the drawings, the part $A^3$ is provided with the wheels $A^4$, which engage the rails $A^5$, so as to permit the part to be easily moved back and forth. Said part $A^3$ is connected with one or more eccentrics C, said eccentrics being connected with the driving-shaft C'. It will thus be seen that as the shaft C' rotates the eccentric or eccentrics move the part $A^3$ back and forth. An intermediate link $C^2$ is preferably associated with the device and interposed between the eccentric and the part $A^3$. This link is pivoted at one end to a fixed part and at the other end to the part $A^3$ and is provided with means for adjusting the position of the eccentric so as to vary its effect. As illustrated in the drawings, said link is provided with a series of holes $C^3$, so that the eccentric connection may be moved up or down to vary its throw. The part $A^3$ is located below the discharge-opening B' in the hopper B. Suitable side plates $B^2$ are provided which prevent the material escaping from the hopper from falling off of the part $A^3$. These side plates may be arranged in any desired manner, and, as herein shown, they are connected with the hopper. It will be seen that by this arrangement the discharge-opening in the hopper is left entirely free, there being no attempt to control it directly.

I have described in detail one construction embodying my invention; but it is of course evident that the parts may be changed in form, construction, and arrangement without in any manner departing from the spirit of my invention. I therefore do not limit myself to the construction shown nor to the means of operating said construction.

The use and operation of my invention are as follows: It is customary in regulating the flow of material from the hopper to control directly the opening in the hopper. In many instances this is impracticable. If, for example, the material fed from the hopper is some such material as "mine-run" coal, which is made up of pieces of all sizes, some being exceedingly small and others very large, it will be seen that in order to directly control the opening in the hopper it becomes necessary to have something powerful enough to cut these large pieces, for otherwise the controlling device for the opening cannot be moved in the event a large piece of coal is in the way. The construction herein shown obviates all such difficulties. In this construction there is no attempt to directly control the opening in the hopper, said opening being left entirely free. This opening is of sufficient size to permit the largest pieces of material to pass therethrough. When the material passes out of the opening in the hopper, it piles up on the part $A^3$, as indicated in Fig. 1, and thus of itself retards, limits, or stops the flow through the opening. When the part $A^3$ is moved, the material thereon is agitated or disturbed, so that a portion of it drops off of the end of said part into the trough or the like in which the conveyer is confined. The amount of material fed at each time can be controlled by adjusting the movement of the part $A^3$—as, for example, by changing the point at which the eccentric is connected with the link $C^2$. When a conveyer of the kind illustrated in Fig. 1 is used, a certain amount of material should be fed in front of each bucket, and hence the movement of the part $A^3$ should be timed with the movement of the conveyer to produce this result. It will also be seen that if too much material is deposited in front of each bucket the bucket will not be able to take it up when it turns the corner and the operation of the conveyer will be injuriously affected. When the device herein shown is employed, the proper quantity of material may be deposited in front of each bucket as the conveyer moves along, and hence a satisfactory result obtained, regardless of the variations in size of the material in the hopper.

I claim—

A device for handling material, comprising a conveyer provided with a series of buckets adapted to move in a substantially horizontal plane during a portion of their travel, a confining device therefor, a receptacle above the confining device and provided with a discharge-opening, a reciprocating part interposed between the confining device and said discharge-opening and in a plane at an angle to the plane of the opening, so that it does not directly control said opening, said reciprocating part adapted to receive the material passing through the opening and check its flow, and means for moving the reciprocating part so as to discharge a uniform amount of material in front of each bucket.

AXEL G. JOHNSON.

Witnesses:
DONALD M. CARTER,
HOMER L. KRAFT.